(12) United States Patent
Wang et al.

(10) Patent No.: US 11,486,690 B2
(45) Date of Patent: Nov. 1, 2022

(54) DIGITAL SENSOR FOR PRE-WARNING OF MULTISTAGE BREAKAGE-TRIGGERED DEFORMATION THRESHOLD

(71) Applicant: TONGJI UNIVERSITY, Shanghai (CN)

(72) Inventors: Wei Wang, Shanghai (CN); Yan Zhang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 61 days.

(21) Appl. No.: 17/132,831

(22) Filed: Dec. 23, 2020

(65) Prior Publication Data

US 2021/0396507 A1  Dec. 23, 2021

(30) Foreign Application Priority Data

Jun. 22, 2020  (CN) .......................... 202010571422.X

(51) Int. Cl.
 *G01L 1/22* (2006.01)
 *G01B 7/16* (2006.01)
(52) U.S. Cl.
 CPC ................ *G01B 7/18* (2013.01); *G01L 1/225* (2013.01); *G01L 1/2287* (2013.01)
(58) Field of Classification Search
 None
 See application file for complete search history.

(56) References Cited

U.S. PATENT DOCUMENTS

| 4,567,774 A * | 2/1986 | Manahan ................. G01N 3/20 |
| | | 73/818 |
| 6,981,423 B1 * | 1/2006 | Discenzo .................. G01L 3/12 |
| | | 73/800 |
| 2016/0290046 A1 * | 10/2016 | Orban ................... E21B 47/007 |

FOREIGN PATENT DOCUMENTS

CN              110068265 A      7/2019

* cited by examiner

*Primary Examiner* — Brandi N Hopkins
*Assistant Examiner* — Nigel H Plumb
(74) *Attorney, Agent, or Firm* — Ohlandt, Greeley, Ruggiero and Perle, LLP

(57) ABSTRACT

A digital sensor for pre-warning of multistage breakage-triggered deformation threshold includes first tension rods, second tension rods, an RFID chip, and a brittle fracture module; the brittle fracture module includes a bottom plate and a plurality of resistors, where two ends of the bottom plate are fixed to the first and second tension rods, and the plurality of resistors forming a lumped parallel circuit are parallelly arranged on the bottom plate; the RFID chip is connected to two ends of the lumped parallel circuit. Strength of the middle cross section of the bottom plate is reduced in the way. The bottom plate will be fractured by being tensioned when the first tension rods and the second tension rods move away from each other with the deformation of the tension members. The resistors are connected into the lumped parallel circuit through brittle wires with different preset slack amounts.

10 Claims, 6 Drawing Sheets

DIGITAL SENSOR FOR PRE-WARNING OF MULTISTAGE BREAKAGE-TRIGGERED DEFORMATION THRESHOLD

TECHNICAL FIELD

The present disclosure relates to the technical field of building monitoring devices, in particular to a digital sensor for pre-warning of multistage breakage-triggered deformation threshold.

BACKGROUND

Tension members are key members for bearing loads in structures, and the bearing capacity of the structures directly depends on ductility of the tension members. In current seismic design of the structures, the tension members are typically allowed to be plastically deformed during severe earthquakes. Therefore, a high deformation capacity of the tension members is required. Generally, it should make sure that tensile portions of the members will not be fractured before the members are fully plastically deformed.

At present, detection methods for steel structural members are fewer than those for concrete members. The steel members in structures are mostly covered by protective components or hidden behind the drywalls. In conventional detection methods, the deformation of the members needs to be detected on their surfaces after coverings on the members are removed, which brings great difficulties in rapid repair of the structures after the earthquake. Intensive labor, high cost, long detection cycle and variable results are typical of conventional inspection methods. In traditional detection methods for installation and deformation of the steel structural members, a total station is used to observe partial characteristic portions of steel structures, and obtained data are compared with data from a designed model to obtain inferred data of the deformation of the structures. These methods have heavy measurement workloads, inaccuracy of detection results, and low labor efficiency caused by data processing. There are few detection methods for axial deformation of the tension members currently. Moreover, they have long operating periods, cannot achieve required detection density, have difficulty in detecting the deformation visually and comprehensively, and cannot meet the detection requirement of steel structure system during construction and post-earthquake.

Chinese Patent 2019102346308 discloses a device for detecting deformation triggered by multi-level exceeding. The device includes a first anchor bolt, a second anchor bolt, a plurality of groups of copper core wires, a radio-frequency identification (RFID) chip, brittle nodes, and resistors, where the first anchor bolt and the second anchor bolt are respectively fixed to two sides of a tension member; the plurality of groups of parallel-connected copper core wires are connected between the first anchor bolt and the second anchor bolt; one group of copper core wires serves as a lumped circuit, and other groups of the copper core wires serve as branch circuits; the RFID chip is arranged in the lumped circuit; and the brittle nodes and the resistors are arranged in the branch circuits. The copper core wires have different amounts of slackness. The lumped circuit has an enough amount of slackness, so as to be prevented from being affected by an external force during detection. However, this patent has shortcomings of poor effects on error control, inconvenience for installation, and the like.

SUMMARY

The objective of the present disclosure is to provide a digital sensor for pre-warning of multistage breakage-triggered deformation threshold. The whole device has a proper structure, a clear measurement principle, stable deformation detection performance, and a low popularization and application cost, and can set multi-level deformation threshold and fulfill no residual deformation in addition to the brittle fracture module of the sensor. By only replacing a consumable of the brittle fracture module, the device can be used again after earthquakes, thus having a wide application prospect in engineering.

To achieve the above purpose, the present disclosure provides the following technical solutions.

A digital sensor for pre-warning of multistage breakage-triggered deformation threshold includes:

first tension rods and second tension rods, where the first tension rods as well as the second tension rods are respectively fixedly connected to two points to be measured on a tension member, and the first tension rods and the second tension rods can move reversely with deformation of the tension members;

a radio-frequency identification (RFID) chip fixedly arranged on the first tension rods; and a brittle fracture module including a bottom plate and a plurality of resistors, where two ends of the bottom plate are fixed to the first tension rods and the second tension rods, and the plurality of resistors forming a lumped parallel circuit are parallelly arranged on the bottom plate; the RFID chip is connected to two ends of the lumped parallel circuit; strength of the middle cross section of the bottom plate is reduced, and in this way, the bottom plate will be fractured by being tensioned when the first tension rods and the second tension rods move away from each other with the deformation of the tension members; and the resistors are connected into the lumped parallel circuit through brittle wires with different preset slack amounts.

Further, tension guide rods are arranged between the first tension rods and the second tension rods; and in this way, the first tension rods and the second tension rods can only move reversely in an axial direction of the tension guide rods.

Further, a static-tension-end retainer is arranged at one ends, fixedly connected to the tension guide rods, of the first tension rods, and a dynamic-tension-end retainer is arranged at one ends of the second tension rods; and tension guide holes in slide fit with the tension guide rods are formed in the dynamic-tension-end retainer.

Further preferably, first through holes allowing the first tension rods to penetrate through are formed in the static-tension-end retainer, and first stop nuts larger than the first through holes are fixedly arranged at ends, penetrating through the first through holes, of the first tension rods; and second through holes allowing the second tension rods to penetrate through are formed in the dynamic-tension-end retainer, and second stop nuts larger than the second through holes are fixedly arranged at ends, penetrating through the second through holes, of the second tension rods.

Further preferably, contraction receding holes allowing the second tension rods to penetrate through are also formed in the static-tension-end retainer.

Further, a first tension gauge length retainer is arranged at distal ends of the first tension rods, and a second tension gauge length retainer is arranged at distal ends of the second tension rods; and a connector fixed to the two points to be measured on each said tension member is arranged on the first tension gauge length retainer as well as the second tension gauge length retainer.

Further, two lead screws are vertically fixed to the two points to be measured on each said tension member; the connectors are disposed around the lead screws and respectively correspond to a first fisheye-shaped connector on the first tension gauge length retainer and a second fisheye-shaped connector on the second tension gauge length retainer.

Further, adjusting lead screws are respectively arranged at ends of the first fisheye-shaped connector and the second fisheye-shaped connector; adjusting through holes allowing the adjusting lead screws of the first fisheye-shaped connector and the second fisheye-shaped connector to penetrate through are respectively formed in the first tension gauge length retainer and the second tension gauge length retainer; and the first fisheye-shaped connector is connected to the first tension gauge length retainer through an anti-skid nut matched with one said adjusting lead screw, and the second fisheye-shaped connector is connected to the second tension gauge length retainer through an anti-skid nut matched with another adjusting lead screw.

Further, enameled wires with a diameter of 0.1 mm are adopted as the brittle wires; and in this way, the brittle wires will be fractured when bearing a tensile force less than 10 N.

Further, there are three resistors which can be set as two or more levels as required.

Compared with the prior art, the present disclosure has the following advantages:

(1) A proper structure as well as clear force transmission mechanism and application principle is fulfilled;

(2) By adjusting preset slack amount of each brittle wire on the bottom plate on a brittle fracture module, expected target deformation can be adjusted in an individual manner to meet the requirement for use or strengthening of the structure;

(3) The brittle wires on the brittle fracture module have a holding force meeting the requirement for brittleness; percent elongation of the enameled wires having a small gauge length can be eliminated by means of calculation; and an impact on operation and detection accuracy of a member is negligible;

(4) The mechanism of detecting the exceedance of multi-level of preset deformation threshold is fulfilled through an organic combination between preset slack amount and brittleness design; in this way, physical deformation difficult to detect because the member in the structure is wrapped can be effectively converted into a resistance signal; and the device can fulfill passive wireless detection and has high conversion accuracy and stable operation performance;

(5) The detection device adopts a printed circuit board (PCB) (namely the bottom plate) as a main stressed portion in an early stage and a wire as the main stressed portion in a later stage; during the detection, the holding force is considerably smaller than a stress of the member and thus has no influence on the mechanical property of the tension member; and furthermore, the device is easy to package and has little influence on the function and appearance of the structure; and (6) The device can be installed and packaged on the tension member when fabricated in a factory, and all portions can be produced and assembled in a normalized manner; and in this way, the digital sensor for pre-warning of multistage breakage-triggered deformation threshold can be produced in a large scale in the factory and has wide popularization and application value.

BRIEF DESCRIPTION OF DRAWINGS

FIG. 2-1 is a top view of a static-end tensile retainer of the present disclosure;

FIG. 2-2 is a front view of the static-end tensile retainer of the present disclosure;

FIG. 2-3 is a left view of the static-end tensile retainer of the present disclosure;

FIG. 3 is a schematic diagram of a brittle fracture module of the present disclosure;

FIG. 5-1 is a top view of a dynamic-end tensile retainer of the present disclosure;

FIG. 5-2 is a front view of the dynamic-end tensile retainer of the present disclosure;

FIG. 5-3 is a left view of the dynamic-end tensile retainer of the present disclosure;

In the figure, 1. first fisheye-shaped connector, 2. first tension gauge length retainer, 3. RFID module retainer, 4. first tension rod, 5. RFID chip, 6. static-tension-end retainer, 601. first through hole, 602. first stop nut, 603. contraction receding hole, 7. brittle fracture module, 701. bottom plate, 702. resistor, 703. brittle wire, 8. tension guide rod, 9. dynamic-tension-end retainer, 901. second through hole, 902. tension guide hole, 10. second tension rod, 11. second tension gauge length retainer, 12. second fisheye-shaped connector.

DETAILED DESCRIPTION

The present disclosure is described in detail below with reference to the accompanying drawings and specific embodiments. The embodiments are implemented on the premise of the technical solution of the present disclosure and provide the detailed implementations and specific operation processes, but the protection scope of the present disclosure is not limited to the following embodiments.

In the following implementations or embodiments, unless otherwise specifically stated, all functional components or structures are conventional components or structures for achieving corresponding functions in the art.

Figure 1:
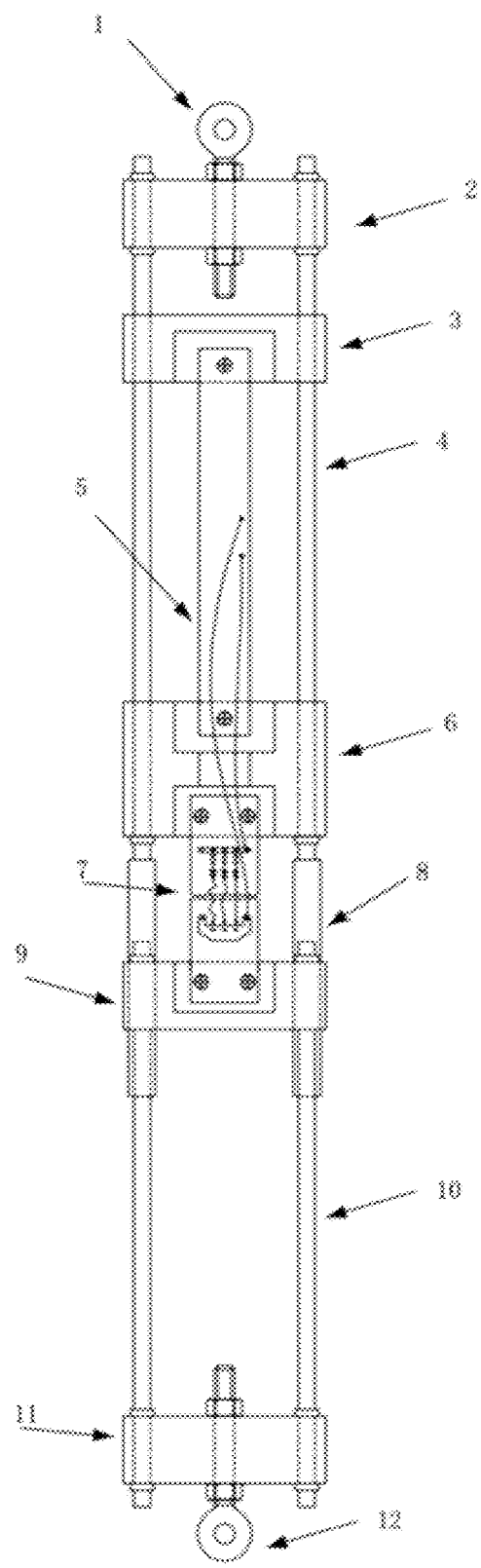
FIG. 1 is a structural diagram of a digital sensor for pre-warning of multistage breakage-triggered deformation threshold of the present disclosure.
Figure 7:
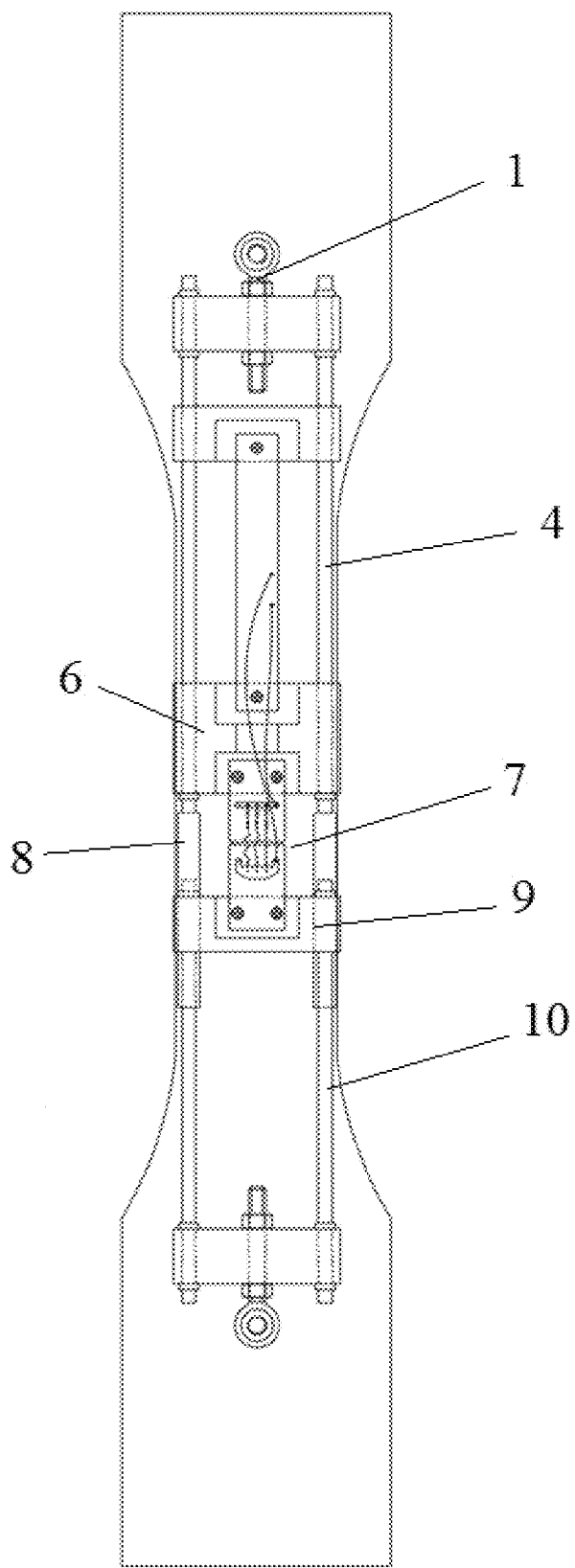
FIG. 7 is an assembly diagram of the digital sensor for pre-warning of multistage breakage-triggered deformation threshold of the present disclosure.

The present disclosure discloses a digital sensor for pre-warning of multistage breakage-triggered deformation threshold, which is of a structure shown in FIG. 1 and FIG. 7, includes first tension rods 4, second tension rods 10, an RFID chip 5, and a brittle fracture module 7.

The first tension rods 4 as well as the second tension rods 10 are respectively fixedly connected to two points to be measured on a tension member, and the first tension rods 4 and the second tension rods 10 can move reversely with deformation of the tension members.

The RFID chip 5 is fixedly arranged on the first tension rods 4.

The brittle fracture module 7 includes a bottom plate 701 and a plurality of resistors 702, where two ends of the bottom plate 701 are fixed to the first tension rods 4 and the second tension rods 10, and the plurality of resistors 702 forming a lumped parallel circuit are parallelly arranged on the bottom plate 701; the RFID chip 5 is connected to two ends of the lumped parallel circuit; strength of the middle cross section of the bottom plate 701 is reduced, and in this way, the bottom plate 701 will be fractured by being tensioned when the first tension rods 4 and the second tension rods 10 move away from each other with the deformation of the tension members; and the resistors 702 are connected into the lumped parallel circuit through brittle wires 703 with different preset slack amounts. Furthermore, "brittleness" of the brittle wires 703 refers to that these wires are prone to fracturing when tensioned.

In a specific implementation of the present disclosure, tension guide rods 8 are arranged between the first tension rods 4 and the second tension rods 10; in this way, the first tension rods 4 and the second tension rods 10 can only move reversely in the axial direction of the tension guide rods 8; and due to restraint of the tension guide rods 8, the first tension rods 4 and the second tension rods 10 only generate displacements with the deformation of the tension members in the axial direction of the tension guide rods 8. In this way, accuracy in detecting the deformation of the tension members in a specific direction is improved.

More particularly, a static-tension-end retainer 6 is arranged at one ends, fixedly connected to the tension guide rods 8, of the first tension rods 4, and a dynamic-tension-end retainer 9 is arranged at one ends of the second tension rods 10; tension guide holes 902 in slide fit with the tension guide rods 8 are formed in the dynamic-tension-end retainer 9; and by means of the slide fit between the tension guide rods 8 and the tension guide holes 902, the first tension rods 4 and the second tension rods 10 can control the stretch direction of a whole device to prevent the device from being deformed out of its axial direction, which may otherwise affects accuracy of measurement.

More preferably, referring to FIG. 2-1 to FIG. 2-3 and FIG. 5-1 to FIG. 5-3, first through holes 601 allowing the first tension rods 4 to penetrate through are formed in the static-tension-end retainer 6, and first stop nuts 602 larger than the first through holes 601 are fixedly arranged at ends, penetrating through the first through holes 601, of the first tension rods 4; and second through holes 901 allowing the second tension rods 10 to penetrate through are formed in the dynamic-tension-end retainer 9, and second stop nuts larger than the second through holes 901 are fixedly arranged at ends, penetrating through the second through holes 901, of the second tension rods 10. Further preferably, contraction receding holes 603 allowing the second tension rods 10 to penetrate through are also formed in the static-tension-end retainer 6. By means of the stop nuts, when the first tension rods 4 and the second tension rods 10 move away from each other, the static-tension-end retainer 6 and the dynamic-tension-end retainer 9 move away from each other along with them; and in addition, when the whole device is stored during transportation, the first tension rods 4 and the second tension rods 10 can oppositely get close via the contraction receding holes 603 to reduce the length of the whole device in its axial direction, so that the convenience for the storage during the transportation is improved.

In a specific implementation of the present disclosure, a first tension gauge length retainer 2 is arranged at distal ends of the first tension rods 4, and a second tension gauge length retainer 11 is arranged at distal ends of the second tension rods 10; and a connector fixed to the two points to be measured on each tension member is arranged on the first tension gauge length retainer 2 as well as the second tension gauge length retainer 11. More particularly, two lead screws are vertically fixed to the two points to be measured on each tension member; the connectors are disposed around the lead screws and respectively correspond to a first fisheye-shaped connector 1 on the first tension gauge length retainer 2 and a second fisheye-shaped connector 12 on the second tension gauge length retainer 11; and the lead screws are nested in the fisheye-shaped connectors and fastened by means of nuts; and in this way, the whole device can be suitable for different points to be measured on tension members.

More particularly, adjusting lead screws are respectively arranged at ends of the first fisheye-shaped connector 1 and the second fisheye-shaped connector 12; adjusting through holes allowing the adjusting lead screws of the first fisheye-shaped connector 1 and the second fisheye-shaped connector 12 to penetrate through are respectively formed in the first tension gauge length retainer 2 and the second tension gauge length retainer 11; the first fisheye-shaped connector 1 is connected to the first tension gauge length retainer 2 through an anti-skid nut matched with one adjusting lead screw, and the second fisheye-shaped connector 12 is connected to the second tension gauge length retainer 11 through an anti-skid nut matched with the other adjusting lead screw; and the adjusting lead screws can be adjusted in length according to different tension members or different measurement requirements of points to be measured on the tension members.

In a specific implementation of the present disclosure, enameled wires with a diameter of 0.1 mm are adopted as the brittle wires 703; and in this way, the brittle wires 703 will be fractured when bearing a tensile force less than 10 N.

In a specific implementation of the present disclosure, there are three resistors 702 which can be set as two or more levels as required.

In this way, during specific operation, after the brittle fracture module 7 is deformed to reach a displacement threshold of a corresponding level, corresponding branch circuits (each resistor 702 corresponds to one branch circuit in series connected to the resistor 702) will be fractured in turn; the resistance value of the lumped parallel circuit will be fed back by RFID chip 5; and afterwards, an RFID reader performs passive wireless scanning (which is a conventional technology in the art, that is, the digital sensor is equivalent to an RFID sensor) on the RFID chip 5 to convert a physical deformation signal of the brittle fracture module 7 into a resistance signal fed back by RFID chip 5. Furthermore, the displacement thresholds will be set in an individual manner according to the amounts of slackness of the brittle wires 703 in series connected to the resistors 702.

The above implementations can be carried out separately, or be carried out in any combination of two or more.

The above-mentioned implementations are described in more detail below with reference to a specific embodiment.

Embodiment 1

Referring to FIG. 1-7, a digital sensor for pre-warning of multistage breakage-triggered deformation threshold includes a first fisheye-shaped connector 1, a first tension gauge length retainer 2, an RFID module retainer 3, first tension rods 4, an RFID chip 5, a static-tension-end retainer 6, a brittle fracture module 7, tension guide rods 8, a retainer dynamic-tension-end 9, second tension rods 10, a second tension gauge length retainer 11, and a second fisheye-shaped connector 12.

The first fisheye-shaped connector 1 is fastened to the first tension gauge length retainer 2 by means of an anti-skid nut; the first tension gauge length retainer 2 is connected to the RFID module retainer 3 and the static-tension-end retainer 6 through the first tension rods 4; left ends of the first tension rods 4 are limited and fixed to the first tension gauge length retainer 2 by means of cylindrical nuts, and right ends of the first tension rods 4 are limited to the static-tension-end retainer 6 by means of the tension guide rods 8 in combination with first stop nuts 602; the first tension rods 4 are axially fastened to the tension guide rods 8 by means of internal and external threads; the RFID chip 5 is connected between the RFID module retainer 3 and the static-tension-end retainer 6 through screws; the tension guide rods 8 slidably penetrate through tension guide holes 902 in the dynamic-tension-end retainer 9 to prevent a device from being deformed out of its axial direction; the brittle fracture module 7 is fixed to the static-tension-end retainer 6 and the dynamic-tension-end retainer 9 through screws; two ends of a lumped parallel circuit of the brittle fracture module 7 are connected to the RFID chip 5 through copper core wires; the second tension rods 10 are connected to the dynamic-tension-end retainer 9 and the second tension gauge length retainer 11 through cylindrical nuts; the second fisheye-shaped connector 12 is fastened to the second tension gauge length retainer 11 by means of an anti-skid nut; the brittle fracture module 7 is a PCB (namely a bottom plate 701) provided with three parallel-connected resistors 702, and each resistor 702 is in series connected to a brittle wire 703 to form a branch circuit in the lumped parallel circuit; after the brittle fracture module 7 connected to the RFID chip 5 is deformed within a measurement gauge length to reach a first/second/third displacement threshold, a first circuit, a second circuit, and a third circuit will be correspondingly fractured; enameled wires with a diameter of 0.1 mm are adopted as the brittle wires 703 used for a brittle fracture within an energized loop, so that the brittle wires 703 can achieve required brittleness; after the first/second/third circuit is fractured, an RFID reader performs passive wireless scanning on the chip; and in this way, a physical deformation signal is converted into a resistance signal by means of feedback of a resistance value of the lumped parallel circuit fed back by the RFID chip 5.

Referring to FIG. 1, the first tension rods 4 sequentially penetrate through the first tension gauge length retainer 2, the RFID module retainer 3, and first through holes 601 in the static-tension-end retainer 6, and are limited and fulfill force transmission by means of the cylindrical nuts at the left ends of the first tension rods 4.

Figures 1, 2:
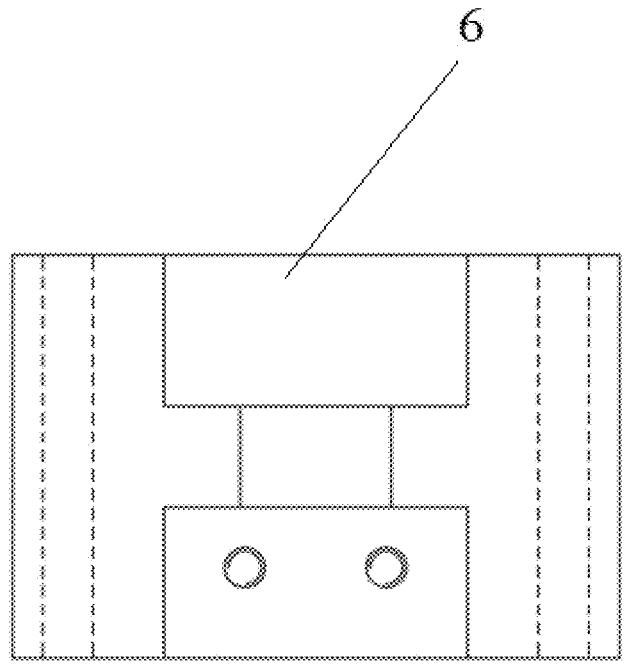
Figure 2:
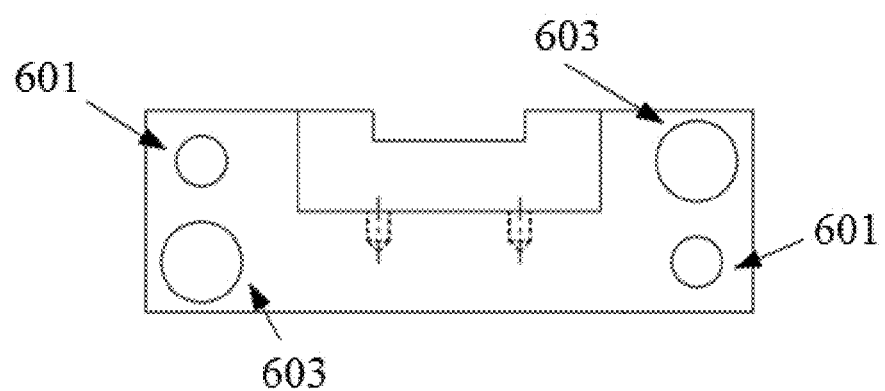
Figures 2, 3:
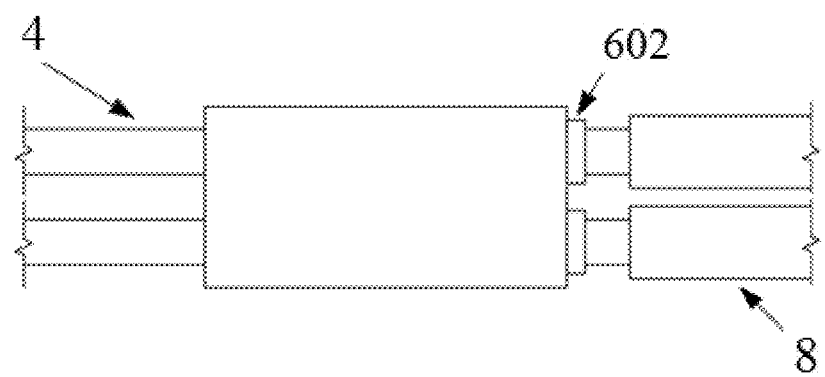
Figure 3:
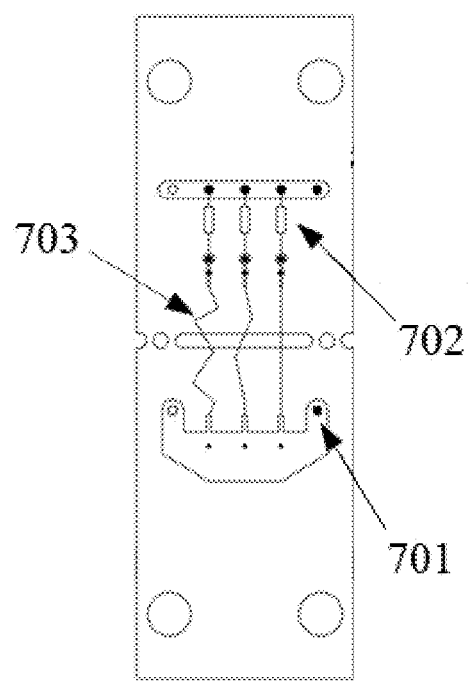

Referring to FIG. 2-1 to FIG. 2-3, two diagonal first through holes 601 and two diagonal contraction receding holes 603 are formed in a cross section of the static-tension-end retainer 6; the first tension rods 4 penetrate through the diagonal first through holes 601 and are axially fastened to the tension guide rods 8 by means of the internal and external threads; and the second tension rods 10 penetrate through the diagonal contraction receding holes 603 in the static-tension-end retainer 6, so as to reduce the length of the device stored during transportation in its axial direction.

Referring to FIG. 3, the brittle fracture module 7 is fixed to the static-tension-end retainer 6 and the dynamic-tension-end retainer 9 through the screws; the two ends of the lumped parallel circuit of the brittle fracture module 7 are connected to the RFID chip 5 through the copper core wires; the brittle fracture module 7 is the PCB (namely the bottom plate 701) provided with three parallel-connected metal film resistors (namely the resistors 702); strength of a cross section of the PCB is reduced; in this way, the PCB can enable the enameled wires welded to two ends of the PCB to have initial rigidity to a certain extent and can protect the enameled wires; when generating serious tensile deformation, the bottom plate 701 will be fractured at a portion with the cross section reduced and has no influence on the subsequent fracture of the brittle wires 703; the deformation of the brittle fracture module 7 mainly refers to relative displacements of two ends of the fractured cross section of the PCB; the enameled wires with the diameter of 0.1 mm are adopted as the brittle wires 703 of branch circuits; deformation thresholds at different levels are set according to the preset slack amounts of the brittle wires 703; the amounts of slackness are set according to the relative distances of solder joints and percent elongation of the enameled wires; and after a tension member reaches a corresponding deformation threshold, the enameled wires will be fractured under a small force, so that the requirement for brittleness is met.

Figure 4:
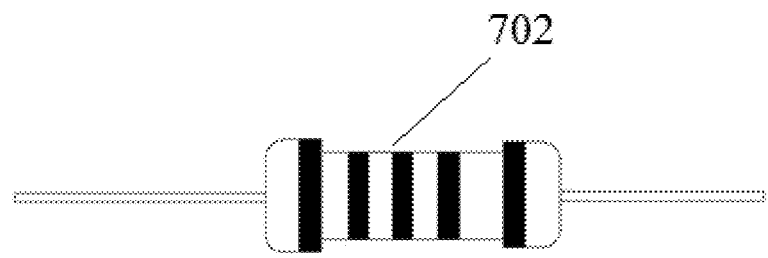
FIG. 4 is a front view of a metal film resistor of the present disclosure.
Figure 6:
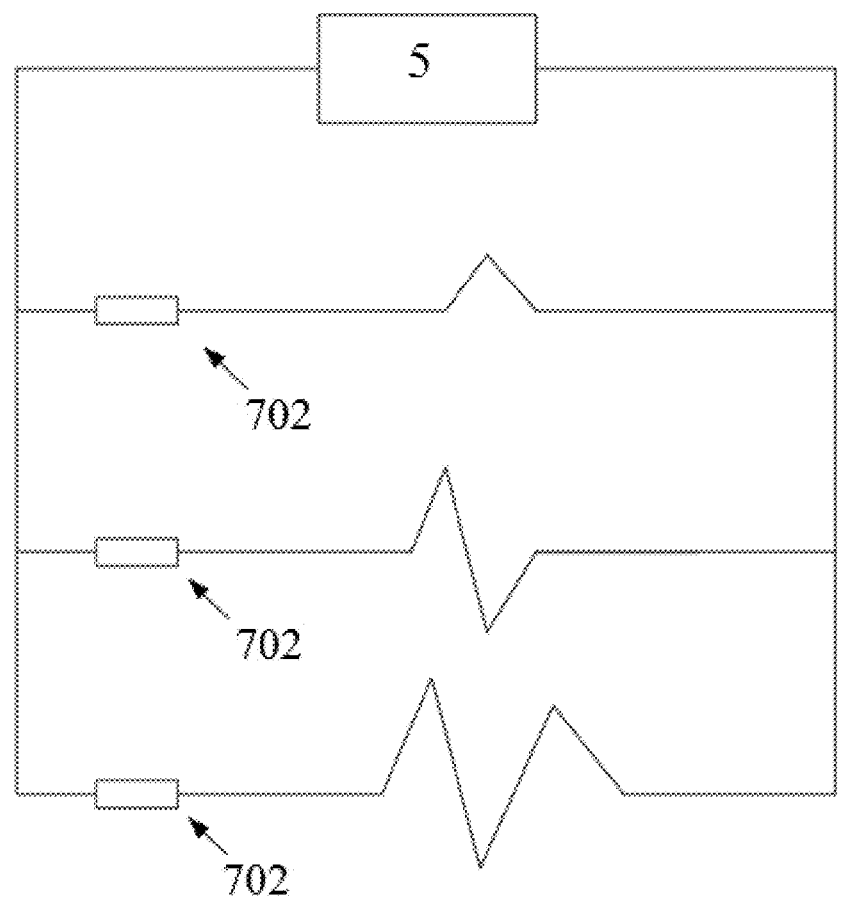
FIG. 6 is an equivalent schematic diagram of the present disclosure.

Referring to FIG. 4 and FIG. 6, the brittle fracture module 7 is the PCB provided with the three parallel-connected metal film resistors, the branch circuits having the resistors 702 are provided with the brittle wires 703 having different amounts of slackness.

Figures 1, 5:
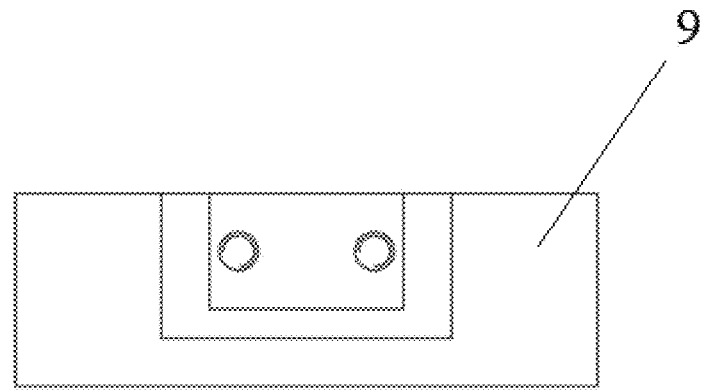
Figures 2, 5:
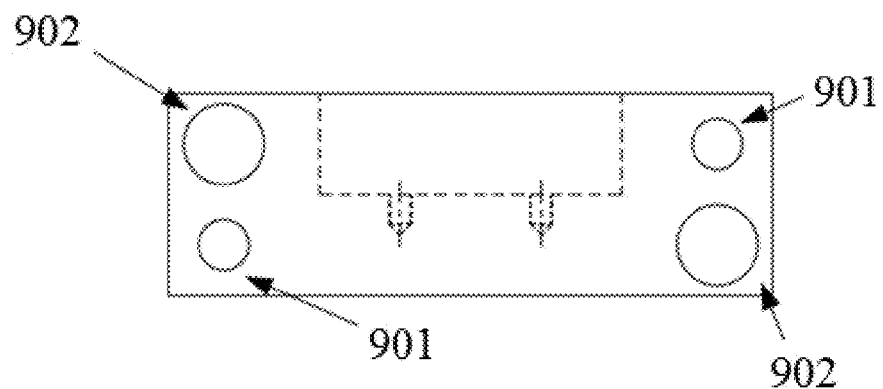
Figures 3, 5:
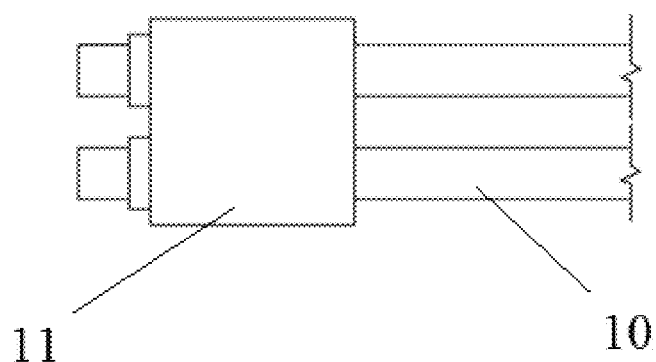

Referring to FIG. 5-1 to FIG. 5-3, two diagonal second through holes 901 and two diagonal tension guide holes 902 are formed in the dynamic-tension-end retainer 9; the second tension rods 10 penetrate through the diagonal second through holes 901; and the tension guide rods 8 slidably penetrate through the tension guide holes 902 in the dynamic-tension-end retainer 9 to axially limit deformation of the device.

In addition, common metal film resistors in the art can be adopted as the resistors 702 in this embodiment.

During specific construction:

(1) The first fisheye-shaped connector 1, the first tension gauge length retainer 2, the RFID module retainer 3, the first tension rods 4, the RFID chip 5, the static-tension-end retainer 6, the brittle fracture module 7, the tension guide rods 8, the dynamic-tension-end retainer 9, the second tension rods 10, the second tension gauge length retainer 11, and the second fisheye-shaped connector having a rod end threaded are processed according to designed sizes.

(2) The first fisheye-shaped connector 1 is fastened to the first tension gauge length retainer 2 by means of the anti-skid nut, the first tension rods 4 sequentially penetrate through the first tension gauge length retainer 2, the RFID module retainer 3, and the static-tension-end retainer 6, and are limited to a corresponding position by means of the cylindrical nuts.

(3) The tension guide rods 8 are screwed to tail ends of the first tension rods 4 by means of the threads and penetrate through the tension guide holes in the dynamic-tension-end retainer 9.

(4) The second fisheye-shaped connector 12 is fastened to the second tension gauge length retainer 11 by means of the anti-skid nut, and the second tension rods 10 sequentially penetrate through the second tension gauge length retainer 11 and the dynamic-tension-end retainer 9, and are limited to a corresponding position by means of the cylindrical nuts.

(5) After the PCB of a corresponding type is completely processed, the resistors 702 are welded to corresponding positions, lengths of the slack brittle wires 703 among the solder joints can be determined based on user demands according to the percent elongation and target deformation thresholds of the enameled wires (namely the brittle wires 703); the enameled wires with different lengths are correspondingly welded to the solder joints in the branch circuits. The brittle fracture module 7 is fixed through screw holes on two ends by means of the screws and gaskets.

(6) The RFID chip 5 is fixed between the RFID module retainer 3 and the static-tension-end retainer 6 by means of the screws and gaskets; the copper core wires having a sufficient length are connected to the solder joints at the two ends of the lumped circuit of the brittle fracture module 7, and the lumped circuit is connected to the RFID chip 5; and after or during the deformation, the RFID reader performs the wireless scanning on the RFID chip 5 to fulfill passive wireless detection.

The digital sensor in this embodiment is compared with Chinese Patent CN2019102346308 in performance below:

As for the Patent 2019102346308, a wire is required to be extremely straight during the implementation of this patented technology. Laboratory verification reveals that if a used wire has an initial bent portion or an incompletely straightened portion, a great error will be caused to a detection result; and if a line connecting two anchorage points is not parallel to a member, a geometric error will also be caused. It can be seen that this sensor cannot control the error excellently. Furthermore, during the implementation of this patent, the member needs to be fabricated on an operation platform before being arranged on a structure and then needs to be assembled; in this process, the sensor installed completely is prone to being affected by uncertain factors during transportation. In addition, pre-stressed bolt anchorage is adopted as an approach to fixation of an end in this patent. Consequentially, it is inconvenient to install the sensor; and if the member is punched, the cross section of the member will be reduced in strength.

Compared with the Patent 2019102346308, the present disclosure has marketability and integrity. Firstly, in terms of error control, because an actual deformation position of a member cannot be determined previously, a detection segment needs to be set over the full length of the member; and in view of this, a sensor of a device of the present disclosure is divided into a rigid module, a signal transmission module, and the brittle fracture module, where the rigid module is composed of the retainers, the tension guide rods, and the like. During actual deformation detection, the rigid module can bear a small axial force (a holding force is determined by the cross section with the strength reduced of the PCB), and elastic deformation is negligible. Therefore, the fact that the sensor is only axially deformed in a local area of the brittle fracture module in use can be guaranteed (compared with Chinese Patent 2019102346308, in which, a wire between the anchorage points is wholly deformed along with the sensor, that is, if the wire has an initial bent portion or an or an incompletely straightened portion, a great error will be caused to a detection result).

Furthermore, tests for verifying accuracy of the sensors in this embodiment and of the Patent 2019102346308 are performed on members having the same axial size. The specific data comparison is shown in Table 1. Test data shows that the solution of the present disclosure is more suitable for detecting small deformation, and can achieve higher detection accuracy. Besides, the modules are all covered with plastic cover plates to protect the core portion of the sensor, and the sensor can be reduced in length when stored during transportation. In addition, the sensor can be installed by welding lead screws to the points to be measured after the members are assembled, that is, non-destructive installation is adopted.

TABLE 1

Comparison of preset displacement threshold and measured displacement of member under monotonic tension at triggering point of sensor

| | Preset displacement threshold (mm) | Actual measured displacement at triggering point of sensor in the solution of the Patent 2019102346308 | Error | Actual measured displacement at triggering point of sensor in the solution of this embodiment | Error |
|---|---|---|---|---|---|
| Trigger level (Level 1) of the sensor | 2.000 | 5.555 | 177.8% | 2.668 | 33.4% |
| Trigger level (Level 2) of the sensor | 8.000 | — | — | 8.744 | 10.1% |
| Trigger level (Level 3) of the sensor | 16.000 | 19.246 | 20.3% | 17.625 | 10.2% |

According to the above specific embodiment, the digital sensor for pre-warning of multistage breakage-triggered deformation threshold of the present disclosure sets multi-level deformation threshold according to the preset slack amounts of the circuits on the brittle fracture module; after the detected area reaches a corresponding deformation threshold, the corresponding brittle wires of the branch circuits are fractured in turn when tensioned; and the resistance of the lumped circuit connected to the two ends of an RFID impedance chip in real time to convert the physical deformation signal to an electrical signal of the detected device. This device is simple in structure, stable in deformation detection performance, easy to package, and suitable for industrial production and prefabricated construction, and can set multi-level expected deformation threshold in an individual manner, thus having a wide application prospect in engineering.

The above description of the embodiments is intended to facilitate a person of ordinary skill in the art to understand and use the present disclosure. Obviously, a person skilled in the art can easily make various modifications to these embodiments, and apply a general principle described herein to other embodiments without creative efforts. Therefore, the present disclosure is not limited to the above embodiments. All improvements and modifications made by a person skilled in the art according to the disclosure of the present disclosure should fall within the protection scope of the present disclosure.

What is claimed is:

1. A digital sensor for pre-warning of multistage breakage-triggered deformation threshold, comprising:
    first tension rods and second tension rods, wherein the first tension rods as well as the second tension rods are respectively fixedly connected to two points to be measured on a tension member, and the first tension rods and the second tension rods can move reversely with deformation of the tension members;
    a radio-frequency identification (RFID) chip fixedly arranged on the first tension rods; and
    a brittle fracture module comprising a bottom plate and a plurality of resistors, wherein two ends of the bottom plate are fixed to the first tension rods and the second tension rods, and the plurality of resistors forming a lumped parallel circuit are parallelly arranged on the bottom plate; the RFID chip is connected to two ends of the lumped parallel circuit; strength of the middle cross section of the bottom plate is reduced, and in this way, the bottom plate will be fractured by being tensioned when the first tension rods and the second tension rods move away from each other with the deformation of the tension members; and the resistors are connected into the lumped parallel circuit through brittle wires with different preset slack amounts.

2. The digital sensor for pre-warning of multistage breakage-triggered deformation threshold according to claim 1, wherein tension guide rods are arranged between the first tension rods and the second tension rods; and in this way, the first tension rods and the second tension rods can only move reversely in an axial direction of the tension guide rods.

3. The digital sensor for pre-warning of multistage breakage-triggered deformation threshold according to claim 2, wherein a static-tension-end retainer is arranged at one ends, fixedly connected to the tension guide rods, of the first tension rods, and a dynamic-tension-end retainer is arranged at one ends of the second tension rods; and tension guide holes in slide fit with the tension guide rods are formed in the dynamic-tension-end retainer.

4. The digital sensor for pre-warning of multistage breakage-triggered deformation threshold according to claim 3, wherein first through holes allowing the first tension rods to penetrate through are formed in the static-tension-end retainer, and first stop nuts larger than the first through holes are fixedly arranged at ends, penetrating through the first through holes, of the first tension rods; and
    second through holes allowing the second tension rods to penetrate through are formed in the dynamic-tension-end retainer, and second stop nuts larger than the second through holes are fixedly arranged at ends, penetrating through the second through holes, of the second tension rods.

5. The digital sensor for pre-warning of multistage breakage-triggered deformation threshold according to claim 4, wherein contraction receding holes allowing the second tension rods to penetrate through are also formed in the static-tension-end retainer.

6. The digital sensor for pre-warning of multistage breakage-triggered deformation threshold according to claim 1, wherein a first tension gauge length retainer is arranged at distal ends of the first tension rods, and a second tension gauge length retainer is arranged at distal ends of the second tension rods; and a connector fixed to the two points to be measured on each said tension member is arranged on the first tension gauge length retainer as well as the second tension gauge length retainer.

7. The digital sensor for pre-warning of multistage breakage-triggered deformation threshold according to claim 6, wherein two lead screws are vertically fixed to the two points to be measured on each said tension member; the connectors are disposed around the lead screws and respectively correspond to a first fisheye-shaped connector on the first tension gauge length retainer and a second fisheye-shaped connector on the second tension gauge length retainer.

8. The digital sensor for pre-warning of multistage breakage-triggered deformation threshold according to claim 7, wherein adjusting lead screws are respectively arranged at ends of the first fisheye-shaped connector and the second fisheye-shaped connector; adjusting through holes allowing the adjusting lead screws of the first fisheye-shaped connector and the second fisheye-shaped connector to penetrate through are respectively formed in the first tension gauge length retainer and the second tension gauge length retainer; and the first fisheye-shaped connector is connected to the first tension gauge length retainer through an anti-skid nut matched with one said adjusting lead screw, and the second fisheye-shaped connector is connected to the second tension gauge length retainer through an anti-skid nut matched with another adjusting lead screw.

9. The digital sensor for pre-warning of multistage breakage-triggered deformation threshold according to claim 1, wherein enameled wires with a diameter of 0.1 mm are adopted as the brittle wires; and in this way, the brittle wires will be fractured when bearing a tensile force less than 10 N.

10. The digital sensor for pre-warning of multistage breakage-triggered deformation threshold according to claim 1, wherein plurality of resistors includes three resistors.

* * * * *